United States Patent [19]

Mitchell

[11] 3,832,597

[45] Aug. 27, 1974

[54] AUTOMATIC VEHICLE LIGHT CONTROL SYSTEM FOR DAYLIGHT DRIVING

[76] Inventor: Bobby Lee Mitchell, 1525 Ivory, Klamath Falls, Oreg. 97601

[22] Filed: July 23, 1973

[21] Appl. No.: 381,389

[52] U.S. Cl.............. 315/82, 307/10 LS, 240/7.1 A
[51] Int. Cl............................................. B60q 1/08
[58] Field of Search .................. 315/77, 80, 82, 83; 307/10 LS; 240/7.1 A

[56] References Cited
UNITED STATES PATENTS

| 3,262,011 | 7/1966 | Cones | 315/82 |
|---|---|---|---|
| 3,341,736 | 9/1967 | Fortney | 315/82 |
| 3,609,449 | 9/1971 | Vercellotti | 315/82 |

FOREIGN PATENTS OR APPLICATIONS

| 682,639 | 3/1964 | Canada | 315/82 |

Primary Examiner—Herman Karl Saalbach
Assistant Examiner—Siegfried H. Grimm

[57] ABSTRACT

In an automotive vehicle it is conventional to provide parking lights, and running lights including high beam and low beam headlights, together with a principal light control switch adapted at any time to be set in either an "off," "park" or a "running" position, and a dimmer switch operable when the principal switch is in running position to choose between high beam and low beam headlights. The present invention includes such a system but combines and coordinates with it supplementary light energizing means for compelling all the running lights to be energized, with the definite exception of the high beam headlights, whenever, day or night, the ignition switch is placed in running position and the transmission is set for forward drive.

4 Claims, 3 Drawing Figures

AUTOMATIC VEHICLE LIGHT CONTROL SYSTEM FOR DAYLIGHT DRIVING

This invention relates to running light control means for automotive vehicles.

There is a growing belief that motor vehicle accidents can be materially reduced if the vehicles are required to have their headlights on substantially whenever they are operated, day or night. Tests are understood to be in progress in a number of states involving the requirement that headlights be on at all times that the vehicle is in operation, day and night, on selected roads or road segments, and it is believed by many motorists that this will prove beneficial and may lead to the adoption of a new rule requiring the activation of headlights during operation of the vehicle substantially at all times, day and night.

Sharing the belief that having the low beam headlights always on during operation in the daytime will contribute to safety, I have contrived a supplemental system of light control, combined with conventional control, which will necessarily insure an active condition of the low beam headlights as a mere incident of running the motor and then setting the vehicle for operation in a forward running gear.

With an arrangement of this kind, under daylight operating conditions turning off of the ignition turns off the running lights, a consequence very much to be desired at the conclusion of daylight driving, because the need for voluntarily turning off the running lights is so likely to be overlooked in the daytime.

According to my system, only the low beam headlights are made subject to automatic control. By this means, the daytime driver, going through a tunnel, will not have to be concerned with the possibility that the high beam lights may be on and that an oncoming driver may be blinded if the dimmer switch is not used in good time. There is never any need for the high beam lights in the daytime. Economy as well as safety opposes their use. The driver's own headlights are not required for showing him the road. Even in a heavy fog they are of no help for that purpose and would be dangerous because they illuminate the fog and conceal the road.

Other objects and advantages will hereinafter appear.

In the drawing forming part of this specification,

Figure 1:
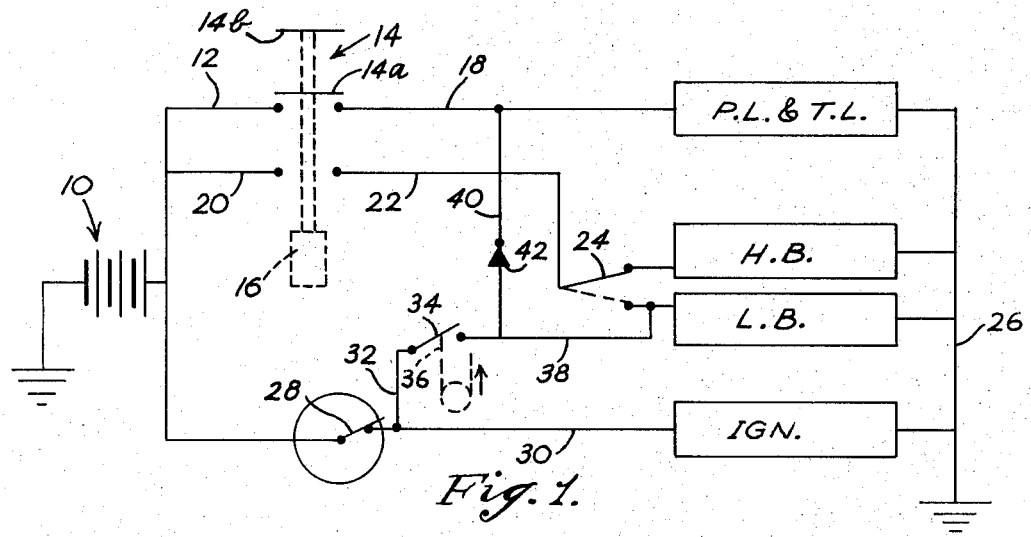
FIG. 1 illustrates my combination system diagrammatically and affords a basis for its description and explanation.

A conventional storage battery 10 furnishes current through a conductor 12 and a conventional manually operable, principal push-pull switch 14 on the dashboard to control the furnishing, or making available, of energizing current to running and parking lights. The switch 14 is shown in an open condition. As will be obvious, pulling of the switch handle 16 to a parking light position in which the conductive switch member 14a bridges the gap between conductors 12 and 18 will turn on the front parking lights and the tail lights designated P.L. and T.L., but not the high beam headlights symbolized by H.B. or the low beam headlights symbolized by L.B.

Pulling of the switch handle 16 to running light position with the conductive switch member 14b bridging the gap between conductors 12 and 18 and conductive switch member 14a bridging the gap between conductors 20 and 22 will not only turn on the parking lights and the tail lights, but will put current through to a dimmer switch 24.

The dimmer switch 24 is shown in its upper position so the circuit will be completed to ground through the high beam headlights H.B. and conductor 26. Transferring the dimmer switch 24 to its lower closed position will extinguish the high beam headlights and put the current through the low beam headlights L.B. and conductor 26 to ground.

All this, with obvious variations, is perfectly conventional. It is retained as a back-up system and for night driving when the high beam headlights may be useful or necessary.

A further conductor leads to a key-operated ignition switch 28. The switch is shown in the closed, drive condition. It can also be key-operated to a utilities position, an off position, and a starting position, but these details are not relevant to the novel features of the present invention.

As shown, the ignition switch 28 is in its closed, operating position, in which, through conductor 30, it energizes the ignition system IGN, causing high potential sparks to be produced sequentially in timed relation in the several cylinders of the engine. This, too, is purely conventional.

For daytime driving the principal light switch 14 is desirably left in the open, inactive position in which it is shown, energizing no lights.

A conductor 32 connects conductor 30, which may be energized through the ignition switch 28, with a normally open switch 34. The switch 34 is connected, non-conductively, through a switch closing tension string or cable 36 to a gear control member which, as an incident of putting the transmission into a forward gear (if the car is a gear shift car) or of putting the control lever into "LOW" or "DRIVE" if the car has automatic transmission, pulls on the cable 36 to close the switch 34.

Closing of the switch 34 causes current to be transmitted through conductor 38 to the low beam headlight circuit L.B., whence it continues to ground through conductor 26.

Figure 2:
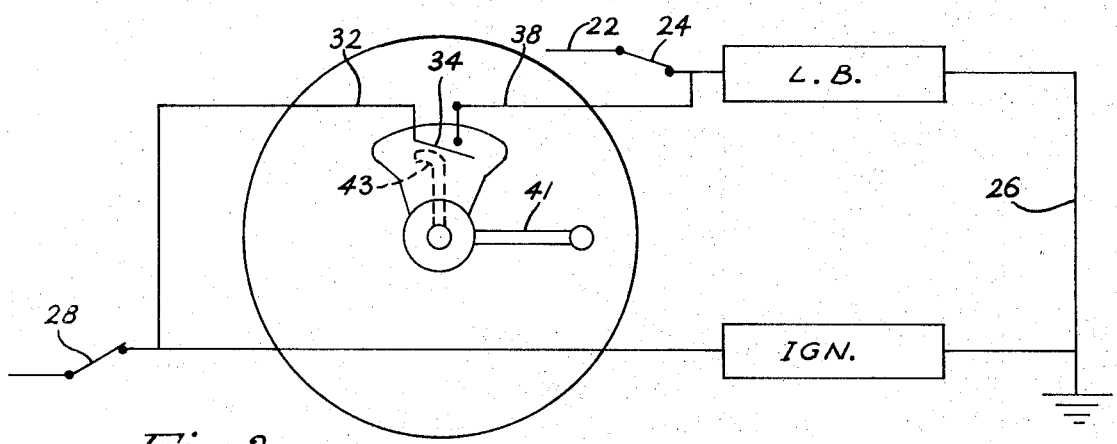
FIG. 2 is a detail view showing how the headlights are made responsive to the gear selecting means in a car equipped with automatic transmission.

In a vehicle having automatic transmission there can be a single switch 34, as illustrated in FIG. 2, to be closed and maintained closed by putting the control lever into "DRIVE" and to be maintained closed by putting the control lever into "LOW."

A typical arrangement in a car equipped with automatic transmission is schematically illustrated in FIG. 2. As shown in FIG. 2, the conventional control lever 41, mounted for rotation about the axis of the steering column, includes a cam member 43 which is inactive in the "PARK," "REVERSE" and "NEUTRAL" positions of the lever, but which presses the normally open switch member 34 closed when the lever is moved clockwise to "DRIVE" and maintains it closed when the lever 40 is operated further in a clockwise direction to "LOW."

Figure 3:
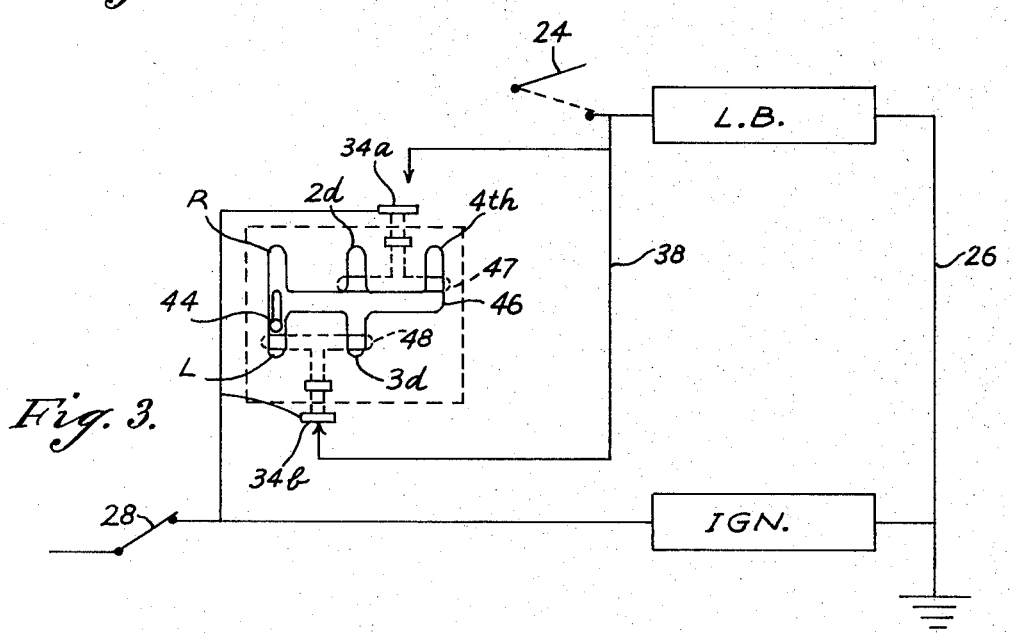
FIG. 3 is a detail view showing how the headlights are made responsive to manual gear shifting means.

A typical arrangement on a gear shift car is shown in FIG. 3.

The pattern of movement of the gear shift lever 44 is indicated at 46. As shown, first and third forward speeds are had with rear positions of the lever 44, and second and fourth forward speeds are had with forward positions of the lever 44.

A switch actuating member 47 stands across the path traversed by the lever 44 when the lever is thrust forward for establishing second or fourth forward speed drive, so that switch 34a is thrust closed and maintained closed by placing of the gear shift lever 44 in second speed or fourth speed position, thereby energizing the low beam headlights.

A switch actuating member 48 stands across the path traversed by the lever 44 when the lever is thrust rearward for establishing first or third forward speed drive, so that the switch 34b is thrust closed and maintained closed by placing of the gear shift lever 44 in first speed or third speed position, thereby energizing the low beam headlights.

The positions indicated for the various forward speeds in FIG. 3 are by no means universal, but the principle involved may be realized through obvious variations of the structure shown. Where convenient the switches 34a and 34b may be closed through tension rather than pressure.

The parking lights and tail lights may be had through the switches 28 and 34 (through 28 and 34a or 34b) along with the low beam headlights, by providing a conductor 40 between conductors 38 and 18, in which conductor 40 a diode 42 is interposed. Since the diode will transmit from 38 to 18 but not in the reverse direction, the parking lights and tail lights can be rendered automatically active along with the low beam lights, but the low beam lights will be unresponsive to the closing of switch member 14a between conductors 12 and 18.

In the drawing the single switch 34 and the single switch actuator cable 36 are to be regarded as symbolic of as many such switches in parallel and as many actuators as may be required for producing the described result.

It will be evident that so long as the switch 14 is open as shown, the opening of the ignition switch will extinguish the low beam lights. A complete breaking of the circuit between 32 and 38, which would occur with the transmission in "NEUTRAL," "REVERSE" or "PARK" would produce a like result.

I have described what I believe to be the best embodiment of my invention. What I desire to cover by Letters Patent, however, is set forth in the appended claims.

I claim:

1. In an automotive vehicle designed to operate with energized low beam headlights throughout all operation of the vehicle in a forward direction, day or night, the combination with such conventional features as
    a. a source of electrical energy,
    b. driving transmission mechanism including variable transmission control means,
    c. an internal combustion engine having an ignition system conductively energized from said source through an ignition switch, which switch is manually settable to a closed position for rendering the engine operable or away from that position for rendering the engine inoperable, and
    d. a conventional lighting system adapted to be energized from said source independently of said ignition switch through a principal, manually settable light switch, which conventional lighting system includes high beam as well as low beam headlights, with said high beam and low beam headlights capable of being rendered alternatively active by the operator when the principal light switch is appropriately set, through a conventional, operator controlled, dimmer switch, which dimmer switch is adapted to be series connected with one terminal of the electrical source through closing of said principal light switch and is adapted to be selectively series connected with the other terminal of the electrical source through either the high beam or the low beam headlights, of
    e. distinct supplementary novel light control means comprising
    $e_1$. supplementary light switch means permanently conductively interposed between the ignition switch and the low beam headlights to the exclusion of the dimmer switch and the high beam headlights, and thus rendered capable, when the ignition switch is closed, of rendering the low beam headlights, but not the high beam headlights, active, and
    $e_2$. means responsive to the setting of the transmission mechanism for operation in any forward gear to activate said supplementary switch means, and thereby to energize, and to maintain energization of, said low beam headlights, so long as the ignition switch remains in its engine operating position, the construction and arrangement being such that the supplementary light switch means are rendered inactive either by the withdrawal of the ignition switch from engine operating position and/or the transfer of the transmission setting mechanism from all forward gear driving settings.

2. The combination of claim 1 in which the conventional lighting system includes front parking lights and tail lights, and in which conductive connections are provided in series with the ignition switch and in parallel with the low beam headlights, for causing the front parking lights and the tail lights, if not already turned on, always to be automatically turned on in unison with the low beam headlights by the mere turning on of the ignition switch and the closing of the supplementary switch means.

3. The combination of claim 1 in which the driving transmission mechanism is of the automatic transmission drive type and includes a drive selector lever, and the automatic turning on of the low beam headlights is effected whenever, with the engine running, the drive selector lever is placed in any forward drive position.

4. The combination of claim 1 in which the variable transmission control means includes a gear shift lever, movable forward and rearward from neutral to establish selected forward drives, and in which the supplementary switch means includes two switches connected in parallel, one disposed to be closed by the forward movement of the gear shift lever to an available forward drive position and the other disposed to be closed by rearward movement of the gear shift lever to an available forward drive position, so that automatic turning on of the low beam headlights results from the placing of the gear shift lever in any forward drive position.

* * * * *

UNITED STATES PATENT OFFICE
CERTIFICATE OF CORRECTION

Patent No. 3,832,597          Dated August 27, 1974

Inventor(s) Bobby Lee Mitchell

It is certified that error appears in the above-identified patent and that said Letters Patent are hereby corrected as shown below:

Column 4, line 36, before "from" insert -- away --.

Signed and sealed this 5th day of November 1974.

(SEAL)
Attest:

McCOY M. GIBSON JR.          C. MARSHALL DANN
Attesting Officer          Commissioner of Patents